United States Patent [19]

Nikolov et al.

[11] 4,253,868
[45] Mar. 3, 1981

[54] APPARATUS FOR NITRIDING METAL MATERIALS AND FERROALLOYS UNDER PRESSURE

[75] Inventors: Ivan D. Nikolov; Tzolo V. Rashev; Iliya G. Chorbov; Ivan M. Peychev; Hristo G. Penchev; Marin I. Marinov; Alexander K. Bradvarov, all of Sofia, Bulgaria

[73] Assignee: Institute po Metaloznanie I Technologia Na Metalite, Sofia, Bulgaria

[21] Appl. No.: 15,337

[22] Filed: Feb. 26, 1979

[30] Foreign Application Priority Data

Feb. 27, 1978 [BG] Bulgaria .................. 38859

[51] Int. Cl.³ .................................... C21C 7/00
[52] U.S. Cl. ................................... 75/59; 75/60; 75/129
[58] Field of Search .................. 75/59, 60, 129

[56] References Cited

U.S. PATENT DOCUMENTS

| 2,058,494 | 10/1936 | Ostrofsky | 75/11 |
| 2,797,156 | 6/1957 | Saunders | 75/28 |
| 2,860,080 | 6/1956 | Wanamaker | 148/13.1 |
| 2,989,429 | 6/1961 | Tanczyn | 148/20.3 |
| 3,180,726 | 4/1965 | Nakamura | 75/59 |
| 3,230,075 | 1/1966 | Nakamura | 75/59 |
| 3,257,197 | 6/1966 | Death | 75/59 |
| 3,320,053 | 5/1967 | Lehman | 75/59 |
| 3,619,173 | 11/1971 | Parlee | 75/59 |

Primary Examiner—P. D. Rosenberg
Attorney, Agent, or Firm—Karl F. Ross

[57] ABSTRACT

An apparatus for nitriding metal materials and ferroalloys under pressure in which a melting furnace is positioned above a pulverizing chamber and connected thereto, with an intake chamber, provided with a pulverizer, disposed in between with a dust-catching cyclone having a suction collector being connected to the upper portion of the pulverizing chamber. An exchange hopper is connected to an outlet formed in the lower portion of the pulverizing chamber and feeds into an inlet end of a pipe furnace which in turn, feeds into an intermediate hopper. An end hopper is positioned beneath the intermediate hopper and connected thereto and feeds into a briquetting installation. Separate pipe conduit systems are connected to the various elements of the apparatus for supplying pressurized nitrogen thereto or for the evacuation thereof.

8 Claims, 1 Drawing Figure

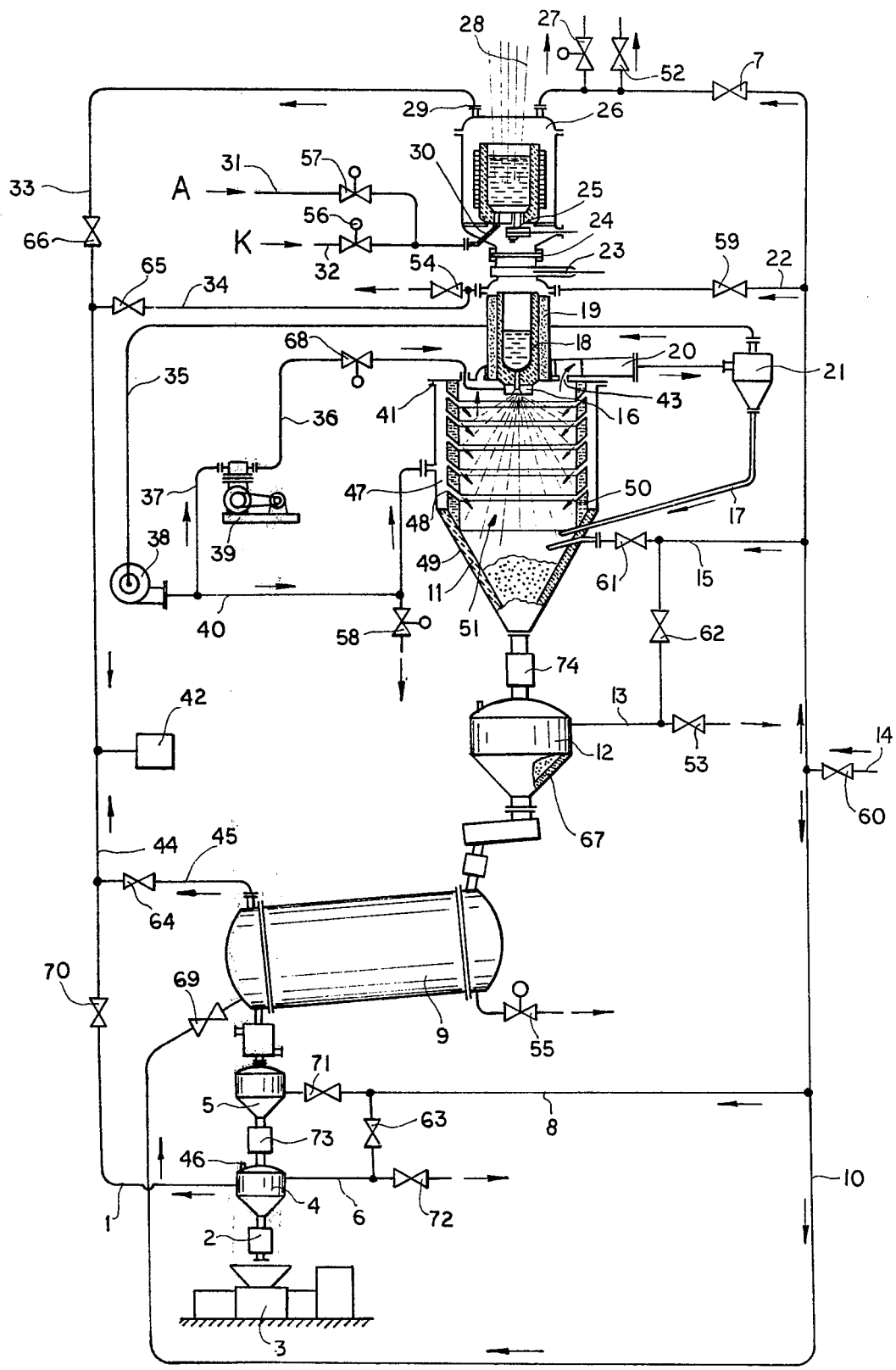

APPARATUS FOR NITRIDING METAL MATERIALS AND FERROALLOYS UNDER PRESSURE

FIELD OF THE INVENTION

This invention relates to an apparatus for nitriding metal materials and ferroalloys under pressure, particularly in ferrous metallurgy.

BACKGROUND OF THE INVENTION

There are known apparatuses for nitriding metal materials and ferroalloys, operating at increased pressures in stationary conditions. In them, the material to be nitrided is crushed and then poured into crucibles or vessels, which are heated in furnaces operating at increased pressures. After the conclusion of the nitriding process, the heating of the furnaces is cut-off and after the nitrided material has cooled down to a preset temperature, the pressure inside the furnaces is released to become equal to the atmospheric and the nitrided material is removed.

In other known apparatuses the material is nitrided in a molten state. This is performed inside melting furnaces, operating at increased pressure, and the molten material is nitrided by bottom blowing through the crucible.

There are also known apparatuses for nitriding materials in nonstationary conditions. These are pipe furnaces comprising internal rotating pipes, in the one end of which enters the material to be nitrided and from the other end of which comes out the already nitrided material. These apparatuses are not pressurized and operate in nitrogen medium with a pressure slightly higher than atmospheric.

The drawbacks of the apparatuses operating in stationary conditions lie in the cyclicity of the nitriding process, the great energy losses for initial heating of the furnace, the long duration of the cooling of the furnace and the material charge down to a preset temperature, and their low productivity. A further drawback is the difficult removal of the nitrided material from the vessels in which it has been nitrided because of its sintering caused by its volume expansion as a result of nitriding. The removal of the material from the crucibles or vessels after nitriding is effected manually in extremely bad hygienic work conditions.

The apparatuses for nitriding in nonstationary conditions have a higher productivity than those operating in stationary conditions, but in them the nitrogen consumption is very high because they are not pressurized and the percentage of taken-up nitrogen is low because of the low pressure at which these apparatuses operate.

A common drawback of the apparatuses operating in stationary, as well as in nonstationary conditions, lies in the necessity for the material to be nitrided to be previously decarbonized as well as crushed to the smallest possible size of the particles, since this influences considerably the percentage of taken-up nitrogen. The crushing of the materials leads to high costs because of their great hardness.

The drawbacks of the apparatuses for nitriding materials in molten state lie in the small percentage of taken-up nitrogen, the extremely long duration of the nitriding process, as well as in the impossibility of good control of the process, this resulting in the impossibility in many cases to achieve a repeatability of the end results.

OBJECTS OF THE INVENTION

It is, therefore, a general object of this invention to avoid the aforementioned drawbacks by providing an apparatus for nitriding metal materials and ferroalloys, operating at increased pressure, the percentage of the taken-up nitrogen being maximum and the productivity high, and all this at a low cost of the finished products; and also providing for reliable, safe and high-quality operation.

SUMMARY OF THE INVENTION

This object is achieved by an apparatus for nitriding metal materials and ferroalloys under pressure, comprising a melting furnace which is removable and is tightly fastened to the intake chamber of a pulverizing device by means of a bayonet connection in its bottom portion, the intake chamber housing a crucible disposed therein with a pulverizer mounted in its base. The intake chamber of the pulverizing device is connected tightly to the cover of the pulverizing chamber, which is connected through holes in the cover and a suction collector to a dust-catching cyclone. The pulverizing chamber is provided along the inner surfaces of the body walls with water-cooled screens, in which there are shaped ring-type nozzles. Its bottom portion is double-cone with thermal insulation and is connected by means of a system of feeders on a pipe furnace, to the outlet end of which there is mounted an intermediate hopper, connected to an end hopper, beneath which there is disposed a briquetting installation. The melting furnace is provided with a device for bottom blowing-through of the melt, which is connected to pipe conduits for nitrogen and oxygen, the bottom end of the melting furnace having a stop valve for the melt. The intake chamber of the pulverizing device is closed from above with a slide valve.

The upper portion of the dust-catching cyclone is connected by a system of pipe conduits, a ventilator and a compressor to the pulverizer, disposed in the base of the crucible in the intake chamber, and at the same time also connected to the pulverizing chamber by means of a pressure pipe conduit. The bottom part of the cyclone is connected by means of a dust conduit to the pulverizing chamber.

The apparatus is provided with a pipe conduit for nitrogen, made-up of an inlet pipe conduit, connected through a stop valve to a linear pipe conduit, the ends of which are connected through stop valves to the melting and the pipe furnace, respectively. To the same linear pipe conduit there are connected through respective pipe conduits and stop valves also the intake and the pulverizing chambers of the pulverizing device, as well as the intermediate hopper. A mixing hopper between the melting furnace and pipe furnace is also connected by an additional pipe conduit and a stop valve to the pipe conduit supplying nitrogen into the pulverizing chamber. The end hopper is also connected by an additional pipe conduit and a stop valve to the pipe conduit supplying nitrogen to the intermediate hopper. All additional pipe conduits are provided with outlet valves.

The apparatus in accordance with the present invention is also provided with a pipe conduit installation for evacuation, comprising a vacuum pipe conduit, both ends of which are connected to the melting furnace and the end hopper, respectively. The intake chamber of the pulverizing device and the pipe furnace are connected by additional pipe conduits with stop valves to this same vacuum pipe conduit.

The apparatus is also provided with closing devices for isolating its different units. They are disposed after the pulverizing chamber and after the intermediate and the end hopper.

The advantage of the apparatus for nitriding metal materials and ferroalloys in accordance with the present invention lies in that it provides a continuous flow-line operation. Thus there is eliminated the excess consumption of energy for heating the material and the apparatus, as compared with the apparatuses operating in stationary conditions. The material can be decarbonized in the movable melting furnace to the necessary level and then it can be nitrided, to a certain degree, in liquid state. Moreover, in the furnace is is not only decarbonized, but also correspondingly alloyed with the necessary additives.

The apparatus of the invention provides a possibility for the material to be pulverized in a nitrogen medium, its surface area increasing many times during the process of crystallization of the individual dust particles, the process of nitriding continues. The process of crystallization of the dust particles in the pulverizing chamber is dry, so there is no trickle of water along the screen walls and the pulverized material enters, at a very high temperature, the furnace with rotating pipe, where the next step of nitriding takes place. For the reason of preserving the temperature of the pulverized material, the conical bottom of the pulverizing chamber, as well as the mixing hopper are thermally insulated.

Two effects are achieved by the pulverization of the material. First, the process of nitriding is intensified and, second, the savings resulting from the elimination of the difficult process of crushing the material are considerable.

The process of nitriding the material ends in the pipe furnace. The design of the rotating pipe permits the same to be maximally filled with material and this provides for a prolonged stay of the material in conditions of increased nitrogen pressure at high temperature with the result in being a high final percentage of the taken-up nitrogen.

The provision to decarbonize the material and to evacuate the whole installation provides good end results at minimum nitrogen consumption.

The provision of continuity of the nitriding process is due to the removability of the melting furnace, the provision of a sliding valve, of closing devices for the hoppers, as well as of pneumatic and a vacuum installations. The movability of the melting furnace provides a possibility to use during the operation, two furnaces, thus achieving stability in the operation of the apparatus.

The provision of a briquetting installation makes it possible to produce a finished product, which is very precisely metered in an appropriate shape volume and weight. This facilitates the operation in the different cases of application in ferrous metallurgy.

The apparatus in accordance with the invention provides for a maximum mechanization and automation of the production process, reducing to a minimum the manual labor and that in perfect hygienic conditions.

For a better understanding of the invention, reference should be made to the accompanying drawing in which there is illustrated a preferred embodiment of the invention.

SPECIFIC DESCRIPTION

The apparatus for nitriding metal materials and ferroalloys in accordance with the present invention comprises a movable melting furnace 26 having a hatch 29 for evacuation, in the upper part thereof in which there are also provided devices for taking samples, introducing additives, measuring the temperature etc. denoted by numeral 28. In the bottom part of the melting furnace 26 there is provided a device 30 for bottom blowing-through of the melt, connected to pipe conduit 31 with pressure-reducing valve 57 for nitrogen and pipe conduit 32 with pressure-reducing valve 56 for oxygen. In the bottom part of furnace 26 there is also provided a stop valve 25 for melt. Furnace 26 is mounted and sealed against the intake chamber 19 by means of a bayonet connection 24; in this chamber there is disposed a crucible 18 provided with a pulverizer 16 in the base thereof. In the upper part of intake chamber 19 there is mounted a slide valve 23, connected tightly to the cover 41 of the pulverizing chamber 51, which is provided along the inner surfaces of the walls with water-cooled screens 48 in which there are formed ring-shaped nozzles 50. The pulverizing chamber 51 has a double conical bottom 49 with thermal insulation 11, while the cover 41 is provided with holes 43, connected through a suction collector 20 to a dust-catching cyclone 21, which is provided with a return dust conduit 17 and a pneumatic pipe conduit 35, connected to the suction part of a high-pressure ventilator 38. The pressure pipe conduit 40 of ventilater 38 is connected to the space between the body 47 of the pulverizing chamber 51 and the water-cooled screens 48, and it is provided with a pressure-reducing valve 58. The pressure pipe conduit 40 on the other side, is connected through the suction pipe conduit 37 of compressor 39, the pressure pipe conduit 36 and pressure-reducing valve 68 to the pulverizer 16. In its bottom end the pulverizing chamber 51 is provided with a closing device 74, connected to a mixing hopper 12, which is thermally insulated on the inside (67). Hopper 12 is connected to pipe furnace 9, the outlet end of which is connected to an intermediate hopper 5, which is connected through a closing device 73 to an end hopper 4, which is provided with a level transducer 46 and a closing device 2. Beneath the closing device 2 there is disposed the briquetting installation 3.

The apparatus comprises pipe conduit 14 for nitrogen, connected through a stop valve 60 to a linear pipe conduit 10, which is connected at one of its end through stop valve 69 to the pipe furnace 9, and in its other end, through stop valve 7, to melting furnace 26. The intake chamber 19 is provided with an outlet valve 54 and a pipe conduit 22 with valve 59, connected to the linear pipe conduit 10. The pulverizing chamber 51 is connected through valve 61 and pipe conduit 15 to the linear pipe conduit 10, while the mixing hopper 12 has a pipe conduit 13 with outlet valve 53 and between pipe conduits 15 and 13 there is a connection through valve 62. The intermediate hopper 5 is connected through stop valve 71 and pipe conduit 8 to the linear pipe conduit 10 and the end hopper 4, the latter having a pipe conduit 6 with outlet valve 72 and between pipe conduits 6 and 8 there is a connection through valve 63.

The apparatus is provided with a vacuum installation 42 with vacuum pipe conduit 44, which through pipe conduits 1, 45, 34 and 33 and valves 70, 64, 65, 66 is connected respectively to the end hopper 4, the pipe furnace 9, the intake chamber 19 of the pulverizing chamber 51 and the movable melting furnace 26.

The operation of the apparatus of the invention is as follows. In the movable melting furnace 26 the crucible is charged with a material to be nitrided. The material is melted, while slide valve 23 is closed. The furnace 26 is evacuated through hatch 29 and valve 66, and through pipe conduit 32 and pressure-reducing valve 56 there is supplied oxygen to the device 30 for bottom blowing through the melt, the material being decarbonized. Then the delivery of oxygen is stopped and valve 56 is closed, and nitrogen is delivered through pipe conduit 31 and pressure-reducing valve 57 for nitriding the material in a molten state. After that, the pressure inside furnace 26 is increased up to working pressure. During the nitriding of the material in a molten state, all remaining spaces of the apparatus are evacuated. After the termination of the evacuation, nitrogen is delivered and the pressure is increased, the slide valve 23 being opened. During the treatment of the material in the melting furnace the devices 28 are used for taking samples, introducing additives, measuring the temperature etc. After these operations the high-pressure ventilator 38 and the compressor 39 are actuated. The heating of the pipe furnace 9 is switched-on and the water begins to circulate in the water-cooled screens 48. Then stop valve 25 for the melt is opened and the melt enters into the crucible 18 inside the intake chamber 19 and the pulverization of the material begins. The closing device 74 is opened and the pulverized material enters into the mixing hopper 12, and from there—into the pipe furnace 9. The nitrided material is cooled and, passing through the intermediate hopper 5 and the closing device 73, enters the end hopper 4.

When the end hopper 4 is filled, the level transducer 46 gives a signal and the closing device 73 is closed. Closed also is valve 63 and outlet valve 72 is opened, and the pressure in the end hopper 4 becomes equal to atmospheric. Then the closing device 2 is opened and the nitrided material enters the briquetting installation 3. Then closing device 2 and outlet valve 72 are closed and valve 70 is opened and the end hopper is evacuated, and nitrogen is delivered towards the end hopper 4 through pipe conduit 6. The closing device 2 is then opened and the nitrided material from the intermediate hopper 5 enters the end hopper 4. After its filling, the aforedescribed operations are repeated.

When the melt from the melting furnace 26 enters the crucible 18, slide valve 23 is closed, as well as valve 7, and outlet valve 52 is opened and the pressure inside the movable melting furnace becomes equal to atmospheric. The melting furnace 26 can be opened and again loaded with a charge for treatment. Melting furnace 26 is connected by means of bayonet joint 24 to intake chamber 19; if necessary, it can be released from the joints and it can be replaced by another reserve melting furnace. It is possible, after the closing of closing device 74, to depressurize the pulverizing chamber and to carry out any necessary repair and reconditioning of the crucible 18 and the pulverizer 16. Then this portion of the installation is evacuated to produce an increased pressure by a special medium and to be again put into operation. During this time the mixing hopper 12, after taking up the necessary quantity of pulverized material, makes it possible for the remaining portion of the apparatus to continue operation.

In the pulverizing chamber, the high-pressure ventilator 38 blows nitrogen at high speed through the ring-shaped nozzles 50 of the water-cooled screens 48 and meets the hot pulverized particles, cools them and they crystallize before reaching the walls of the water-cooled screens 48. The nitrogen entering the pulverizing chamber 51 leaves through holes 43 and the suction collector 20 and through the dust-catching cyclone 21, being sucked by the high-pressure ventilator 38. The dust particles deposited in cyclone 21 restore through the return pipe conduit 17 to the pulverizing chamber 51. Part of the nitrogen blown by ventilator 38 is sucked-in by compressor 39, which compresses it and delivers it through pipe conduit 36 to the pulverizer 16. Thus, the nitrogen used for pulverizing and crystallization of the material is used in a closed circuit.

During the nitriding in all stages of the apparatus it is necessary to refresh part of the nitrogen and add fresh nitrogen. This is achieved by the release of a minimum quantity of nitrogen through the reducing valves 27, 55, 58 and it is replaced through the supply pipe conduit 14 and the respective pipe conduits of the different elements by fresh nitrogen and the working pressure is maintained equal everywhere.

What we claim is:

1. An apparatus for nitriding metal materials and ferroalloys under pressure comprising:
   a melting furnace;
   an intake chamber beneath said melting furnace and connected thereto;
   a crucible disposed in said intake chamber and having a fluid-operated pulverizer mounted in the base thereof;
   a pulverizing chamber beneath said intake chamber and connected thereto;
   a dust-catching cyclone having a suction collector connected to the upper portion of said pulverizing chamber;
   a mixing hopper connected to an outlet formed in the lower portion of said pulverizing chamber;
   a pipe furnace having an inlet end connected to said exchange hopper and an outlet end connected to an intermediate hopper;
   an end hopper beneath said intermediate hopper and connected thereto and feeding into a briquetting installation; and
   a first pipe conduit system connected to said melting furnace, said intake chamber, said pulverizing chamber, said mixing hopper, said pipe furnace, said intermediate hopper and said end hopper for feeding pressurized nitrogen thereto and a second pipe conduit system for the evacuation thereof.

2. The apparatus defined in claim 1, wherein said melting furnace is provided with means for bottom blowing nitrogen and oxygen through a melt therein, said melting furnace being further provided with a stop valve in the lower portion thereof for controlling the flow of said melt.

3. The apparatus defined in claim 1, further comprising a slide valve between said melting furnace and said intake chamber.

4. The apparatus defined in claim 1, wherein said pulverizing chamber is provided internally with an annular water-cooled screen formed with a plurality of ring-shaped nozzles and a thermally insulated double conical bottom.

5. The apparatus defined in claim 1, wherein the upper portion of said dust-catching cyclone is connected to said pulverizing chamber, a ventilator being disposed between said cyclone and said pulverizing chamber and a compressor and said ventilator being disposed between said cyclone and said pulverizer, the lower portion of said cyclone feeding directly into said pulverizing chamber.

6. The apparatus defined in claim 1, 2, 3, 4 or 5, wherein said first pipe conduit system comprises a nitrogen inlet provided with a first stop valve, a second stop valve between said first valve and said intake chamber, a fourth stop valve between said first valve and said pulverizing chamber, a fifth stop valve between said first valve and said mixing hopper, a sixth stop valve between said first valve and said intermediate hopper and a seventh stop valve between said first valve and said end hopper, said end hopper being further provided with a first release valve and said mixing hopper being further provided with a second release valve.

7. The apparatus defined in claim 1, 2, 3, 4 or 5, wherein said second pipe conduit system comprises a vacuum installation connected to said melting furnace, said intake chamber, said pipe furnace and said end hopper.

8. The apparatus defined in claim 1 further comprising:
- a first closing device between said pulverizing chamber and said mixing hopper;
- a second closing device between said intermediate hopper and said end hopper; and
- a third closing device between said end hopper and said briquetting installation.

* * * * *